US008560229B1

United States Patent
Park et al.

(10) Patent No.: US 8,560,229 B1
(45) Date of Patent: Oct. 15, 2013

(54) SENSOR BASED ACTIVITY DETECTION

(75) Inventors: Timothy Fulton Park, Santa Cruz, CA (US); Steven Lee, San Francisco, CA (US)

(73) Assignee: Google Inc., Mountain View, CA (US)

( * ) Notice: Subject to any disclaimer, the term of this patent is extended or adjusted under 35 U.S.C. 154(b) by 395 days.

(21) Appl. No.: 12/882,433

(22) Filed: Sep. 15, 2010

(51) Int. Cl.
*G01C 21/00* (2006.01)

(52) U.S. Cl.
USPC .......................................... 701/433; 701/516

(58) Field of Classification Search
USPC ................. 701/400, 408–412, 468, 500, 516, 701/433–4; 345/156–158; 340/988
See application file for complete search history.

(56) References Cited

U.S. PATENT DOCUMENTS

| | | | |
|---|---|---|---|
| 8,253,684 B1 * | 8/2012 | Lloyd | 345/156 |
| 2009/0132197 A1 | 5/2009 | Rubin et al. | |
| 2010/0073284 A1 * | 3/2010 | Dods et al. | 345/156 |
| 2011/0260921 A1 * | 10/2011 | Harrat et al. | 342/386 |
| 2012/0007713 A1 * | 1/2012 | Nasiri et al. | 340/5.81 |

* cited by examiner

*Primary Examiner* — Yonel Beaulieu
(74) *Attorney, Agent, or Firm* — McDermott Will & Emery LLP

(57) ABSTRACT

A sensor is used to detect movement of a mobile device. For example, data received from an accelerometer may be averaged together and compared to a threshold value. If the average of the data is greater than a threshold value, the mobile device may be assumed to be moving. This information may be used to control the frequency of data collection by, for example, a GPS receiver in order to maximize utility and minimize power use.

18 Claims, 5 Drawing Sheets

SENSOR BASED ACTIVITY DETECTION

BACKGROUND OF THE INVENTION

Various systems provide real-time location updates for users of mobile devices. Typically, collecting data using GPS devices is considered the most accurate approach. However, GPS devices may consume a relatively large amount of power and may have a significant negative impact on the battery life of a mobile device. Thus, in order to preserve power, these systems must switch between various modes depending on the scenario. For example, the need for the accuracy of the GPS is greatest for high impact scenarios (such as driving or walking around town), and much less so in lower impact situations (such as working in front of a computer). These systems should be able to efficiently switch from GPS to other modes with lower power consumption, for example determining location based on network location data such as IP address.

Presently, mobile devices may exhibit a significant delay in moving between GPS and lower power consumption modes. For example, the accuracy of network location data is relatively low as compared to GPS, and accordingly, it may take considerable movement of the mobile device before the device (or application) recognizes the activity (the mobile device is in motion) and switches to GPS mode to capture the activity. This may result in missing or misidentifying stops that the user has made. In addition, the quality of the location data used (other than GPS) may be too low to determine an exact initial location of the activity.

BRIEF SUMMARY OF THE INVENTION

The present invention relates generally to using sensors to detect movement of mobile devices. More specifically, the data used to detect the movement may be used to control the frequency of data collection in order to maximize utility and minimize power use.

In one aspect, the invention provides method of determining if a client device is moving. The method includes receiving N data points from an accelerometer of the client device; determining, by a processor of the client device, an average of the N data points; and activating a location determination device to generate geographic location information if the average is greater than a threshold value.

In one example, the location determination device is a GPS receiver and the generated geographic location information includes GPS latitude and longitude coordinate pairs.

In another example, the method also includes determining a path of travel associated with the mobile device based on the GPS coordinates. In a further example, the method also includes storing the path of travel at the client device. In yet another example, the method also includes displaying the path of travel on a display of the client device. In another example, the method also includes determining a location visited by the client device based on the GPS coordinates and transmitting the location to a server computer. In one alternative, the method also includes receiving, from the server, a recommended location based on the transmitted location. In another example, the method also includes receiving an additional data point from the accelerometer; removing an oldest data point from the N data points to obtain N−1 data points; determining a second average of the additional data point and the N−1 data points; and determining, by a processor of the client device, that the client device is moving if the second average is greater than the threshold value. In another example, the threshold value describes a limit associated with an average force identified by the accelerometer based on a user's motion.

Another aspect of the invention provides a device to detect movement of a user. The device includes an accelerometer for detecting data points, memory for storing the last N detected data points, a location determination device, and a processor coupled to the accelerometer, memory, and location determination device. The processor is configured to receive the last N detected data points from the accelerometer of the client device; store the last N detected data points in the memory; determine an average of the last N detected data points; and activate a location determination device to generate geographic location information if the average is greater than a threshold value.

In one example, the location determination device is a GPS receiver and the generated geographic location information includes GPS latitude and longitude coordinate pairs. In a further example, the processor is also configured to determine a path of travel associated with the device based on the GPS coordinates. In yet another example, the processor is further configured to store the path of travel in the memory. In another example, the device also includes a display, and wherein the processor is further configured to display the path of travel on the display. In another example, the processor is also configured to determine a location visited by the client device based on the GPS coordinates; and transmit the location to a server computer. In another example, the processor is also configured to receive, from the server computer, a recommended location based on the transmitted location. In another example, the processor is also configured to receive an additional data point from the accelerometer; remove an oldest data point from the last N detected data points to obtain N−1 data points; determine a second average of the additional data point and the N−1 data points; and determine that the device is moving if the second average is greater than the threshold value. In another example, the threshold value describes a limit associated with an average force identified by the accelerometer based on the device's motion.

DETAILED DESCRIPTION

Figure 1:
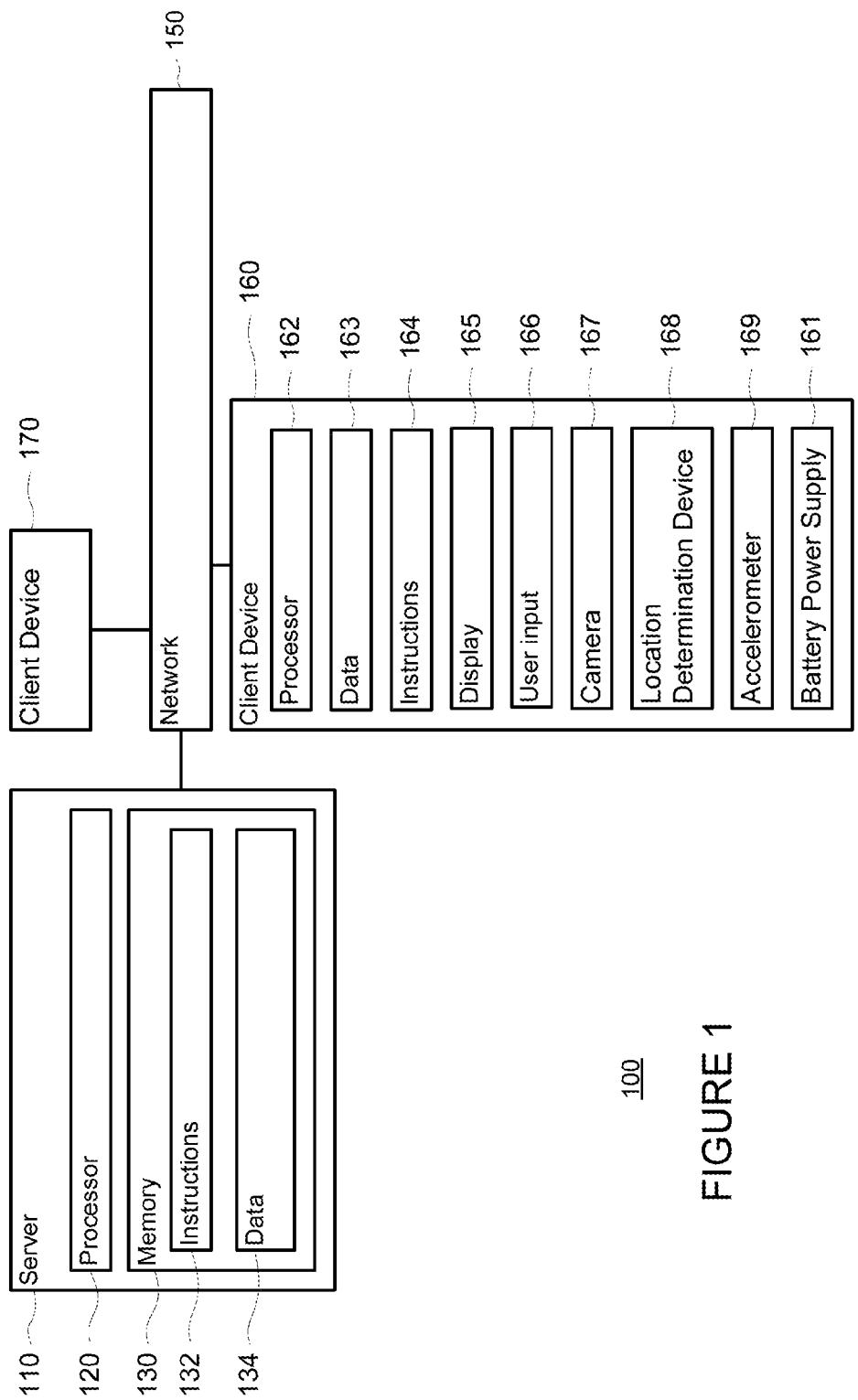
FIG. 1 is a functional diagram of a system in accordance with an aspect of the invention.
Figure 2:
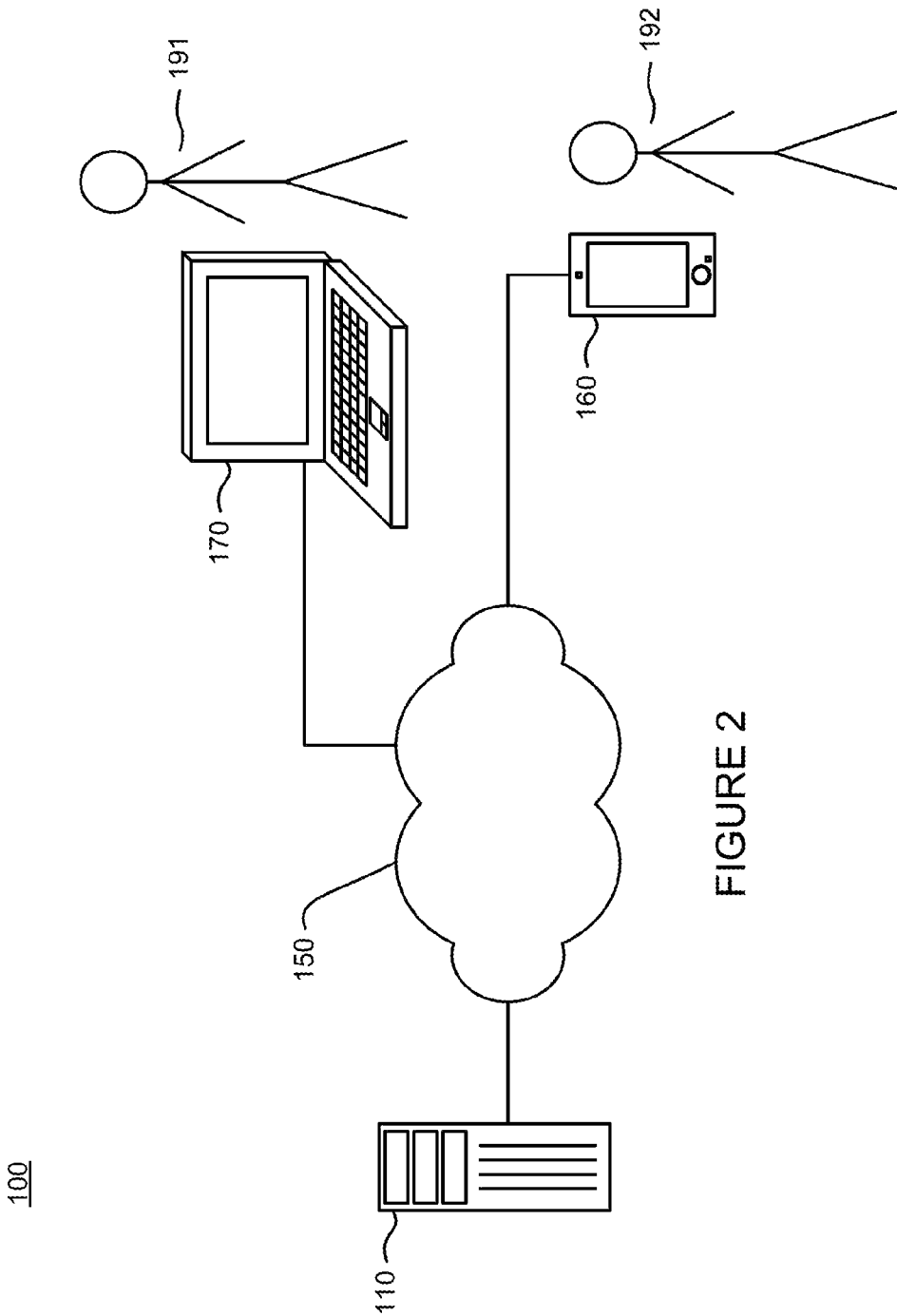
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The computer 110 may be at one node of a network 150 and capable of directly and indirectly communicating with other nodes of the network. For example, computer 110 may comprise a web server that is capable of communicating with client devices 160 and 170 via network 150 such that server 110 uses network 150 to transmit and display information to a user on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions as described above. Each client device 160 or 170 may be a personal computer intended for use by a person 191-192, and have all of the components normally used in connection with a personal computer such as a central processing unit (CPU) 162, memory (e.g., RAM and internal hard drives) storing data 163 [and instructions 164, an electronic display 165 (e.g., a monitor having a screen, a touch-screen, a projector, a television, a computer printer or any other electrical device that is operable to display information), end user input 166 (e.g., a mouse, keyboard, touch-screen or microphone). The client device may also include a camera 167, GPS receiver 168, speakers, a network interface device, a battery power supply 161, and all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 160 may be a wireless-enabled PDA or a cellular phone capable of obtaining information via the Internet. The user may input information using a small keyboard (in the case of a Blackberry-type phone), a keypad (in the case of a typical cellular phone) or a touch screen (in the case of a PDA).

The client devices may also include location determination device 169 to determine the geographic location and orientation of the device. For example, client device 160 may include GPS receiver to determine the device's latitude, longitude and/or altitude position. In another example, the location determination device 169 may comprise software for determining the position of the device based on other signals received at the client device 160, such as an IP address or signals received at a cell phone's antenna from one or more cell phone towers if the client device is a cell phone.

Client device 160 may also include an accelerometer 169 to determine the direction in which the device is oriented. The accelerometer may be used to detect the effect of gravity on the client device measured, for example, in meters per second per second. By way of example only, the client device may use input from the accelerometer to determine the client device's pitch, yaw or roll (or changes thereto) relative to the direction of gravity or a plane perpendicular thereto. In that regard, it will be understood that a client device's provision of orientation data as set forth herein may be provided automatically to the client device.

In addition to the operations described below and illustrated in the figures, various operations in accordance with a variety of aspects of the invention will now be described. It should also be understood that the following operations do not have to be performed in the precise order described below. Rather, various steps can be handled in a different order or simultaneously.

The processor of a client device receives input from the accelerometer. For example, the accelerometer may generate data points faster than 4-5 times per second or as slow as once per second. The "data points" may describe the actual accelerometer readings or, alternatively, the level of variation from some reference point. Generally, the accelerometer has such a low power drain on a client device, such as a mobile phone, that it may be run continuously for a day at a time on current hardware with a relatively low power consumption. If a GPS device were used continuously, however, it may significantly deplete the power supply to the client device in a matter of hours.

Figure 3:
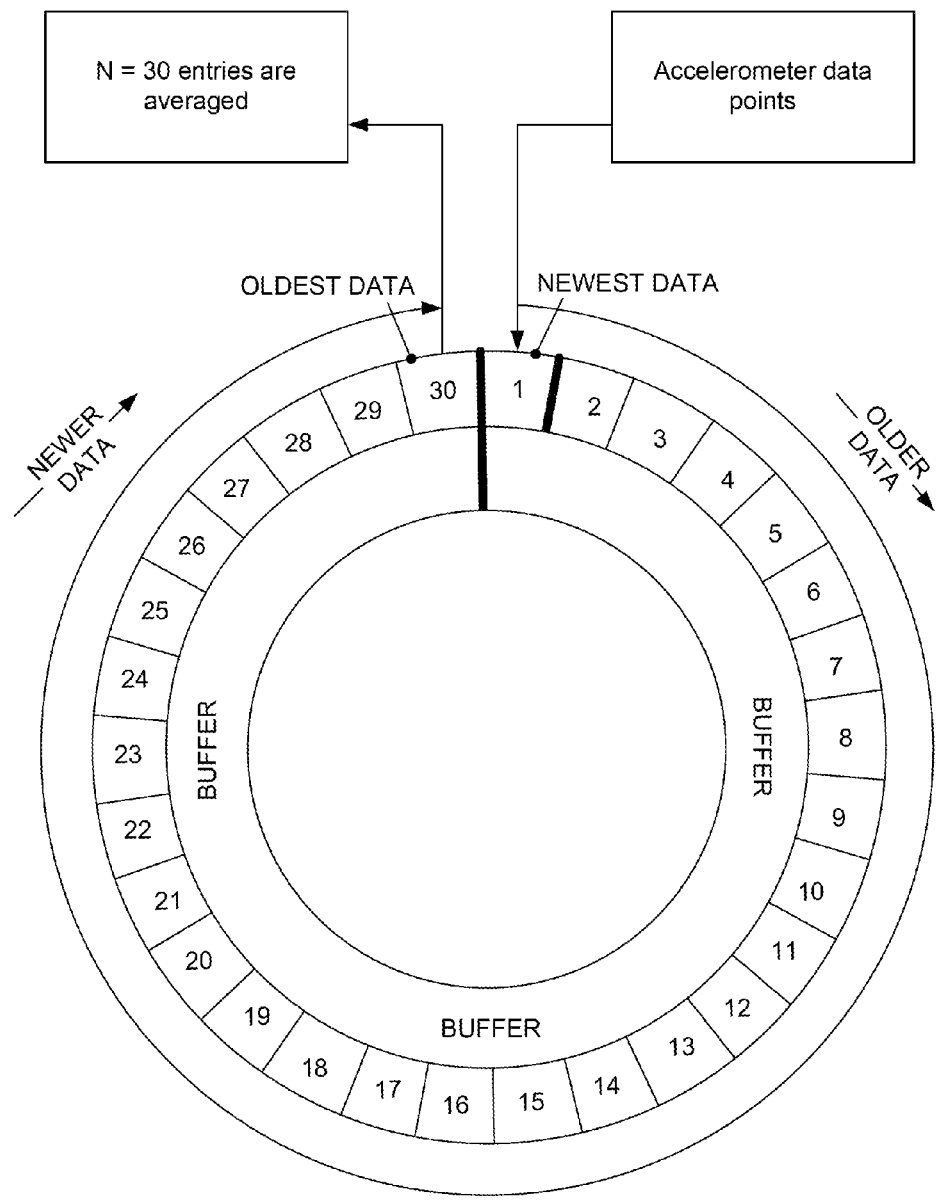
FIG. 3 is a representation of a buffer in accordance with an aspect of the invention.

The data from the accelerometer may be recorded and stored in memory of the client device for a particular period. For example, if the client device uses a memory ring buffer of N entries, data points may be recorded N times until the oldest data point is rewritten. FIG. 3 depicts an exemplary ring buffer of N=30 entries. In this example, the ring buffer retains only the last 30 data points. The data points are written over starting with the oldest data point, N=1. If data is collected 5 times per second, the buffer information is completely rewritten every 6 seconds, and accordingly, the period would be 6 seconds. Thus, if the rate of collection is greater than 5 times per second or if the buffer has less than 30 entries, the period would be less than 6 seconds.

The data stored in the buffer is retrieved by the processor of the client device to determine whether the entries meet a particular threshold. For example, data points from the N=30 entries (or the last 6 seconds) may be averaged together and compared to a threshold value. In one example, the threshold value may be set as an average of 5.0 meters per second per second for the previous 30 entries. The threshold value may represent a minimum level of movement indicating that the client device is in motion. For example, if a user begins walking, the accelerometer may generate input describing the motion of the client device, and to some degree, the motion of the user.

It will be understood that the specific mathematical formulations which are used will be dependent on the type of movement which the system desires to detect. For example, the threshold for a user who is walking would be much greater than the threshold for a user moving in a vehicle along a roadway as less vertical movement would be detected by the accelerometer. Thus, the threshold may be set to avoid activating the GPS when client device (or user) is moving in a vehicle and avoid drain on the power supply.

In another example, even more accurate detection mechanisms couple be employed, such as by processing the accelerometer data using a Fourier transform to identify harmonic strides which may indicate walking at a higher level of confidence. The period of the transform may be similar to the gate at which the user is walking.

If the average of the accelerometer data points is greater than the threshold, the processor may determine that the client device is in motion and trigger operation of the GPS receiver. The processor may send a signal or directly turn on or otherwise "wake up" the GPS receiver if it is in a low power or standby mode. For example, rather than simply taking a single GPS reading to determine the current location of the client device, the GPS receiver may be put into a "burst" mode where the GPS is used to collect location readings quickly such as up to 2 times per second or more with a roughly 5 to 6 second warm-up period using currently available hardware. It will be understood that these values may increase and decrease based on hardware software and firmware improvements. For example, if a user is at a restaurant and walks out an exit, this information may be detected by the accelerometer and tracked by the GPS receiver in a matter of seconds. This immediate activation of the GPS may eliminate a fairly large portion of the latency of presently employed methods described above. In fact, the accelerometer may detect the slightest movements of the user (by way of the client device), thus the threshold value may be selected to avoid false positives and excessive drain on the power supply. Thus, rather than continuously running the GPS to detect relatively small changes in location, the GPS may be left off to avoid unnecessary drain on the power supply.

Once the GPS has been activated or woken up, the GPS may continue to take readings for a particular period or until the accelerometer data drops below the threshold. For example, once the average drops below the threshold, the device may use a timing device to count a particular period, such as for 60 seconds. If the average rises above the threshold again, the GPS may continue to take readings until the average drops below the threshold, when the timer will be restarted. Once the timer expires without going above the threshold, the GPS sampling may be stopped or slowed down. This enables the client device to continue to take readings where the user has merely stopped for a brief period, for example, to look into a store window or to stop at an intersection.

Figure 4:
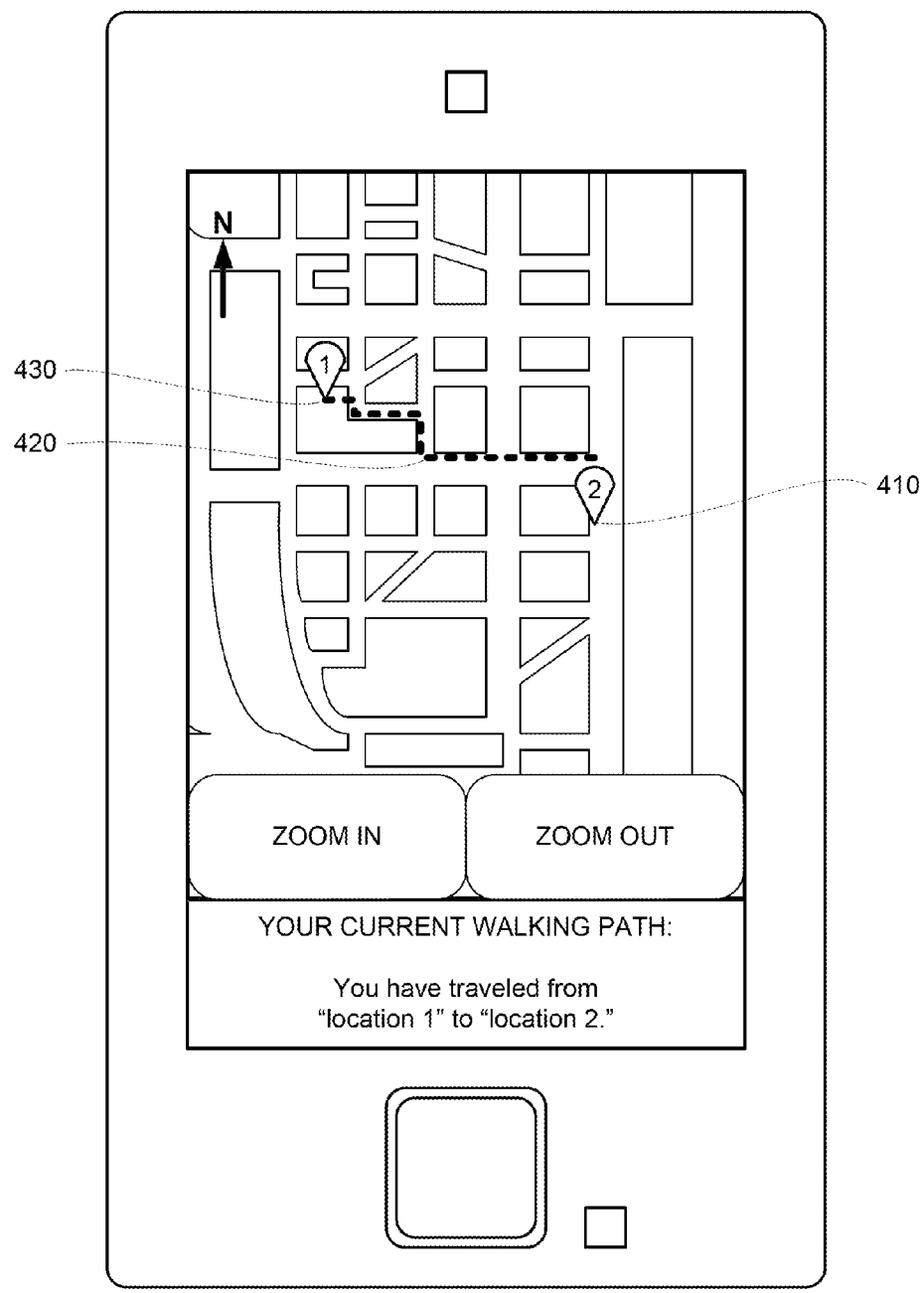
FIG. 4 is a screen shot and client device in accordance with aspects of the invention.

The input form the GPS receiver may be used to determine the movement from one particular location to another. This information may be used in a number of ways. For example, as shown in FIG. 4, the information may be displayed to the user on a map indicating the user's present location 410 and the path 420 which the use has followed since the initial location 430 GPS was activated or began collecting the information. As the updates occur frequently, the current location, address, or latitude and longitude coordinates may be continuously displayed on the user's client device, for example, on a home screen in order to reduce the amount of clicking or touches necessary to see this information. In another example, the client device may provide updates as to the locations of a user's friends. By using the GPS receiver more efficiently, the device may provide more accurate and more frequent location reports to allow for a better identification of the locations of a user's friends.

The location information may also be stored and used to compile a list of the locations which the user frequents. With the user's permission, the location information, or the list of locations, may be transmitted to a second computer, such as a personal computer or server, to be stored for later use. The user may receive suggestions or recommendations for locations to visit which are similar to the locations which the user frequents or which are visited by other users.

The client device may also display or request further information or an option for the device to take some additional action based on proximity to a particular location which the user often visits. For example, if the device determines that the user has a arrived at a particular location, the device may make a suggestion, such as "You've just arrived at Noah's Bagels, would you like to check-in?" In this example, the user may also be provided with the option to select whether to "check-in," and in response, the client device may send the relevant information to the location.

Figure 5:
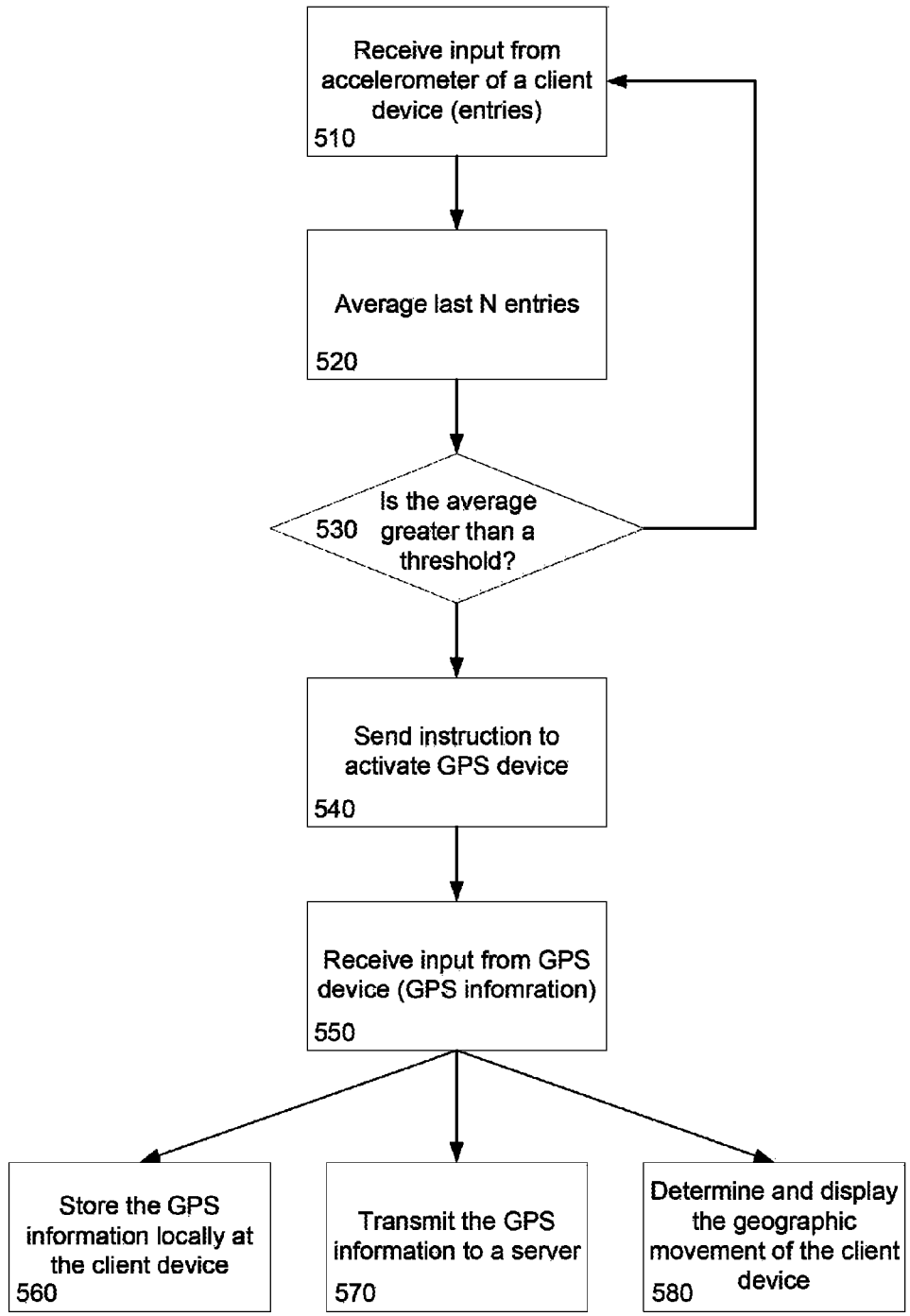
FIG. 5 is a flow diagram in accordance with an aspect of the invention.

FIG. 5 is an exemplary flow diagram of the process described above. As shown in block 510, input data is received from an accelerometer. The input data describes the motion of a client device. The input data entries from the accelerometer are collected until the N entries have been recorded. The last N entries are averaged together as shown in block 520. The average is then compared to the threshold value as shown in block 530. If the average is less than the threshold, the accelerometer information continues to be updated. Thus, the next entry will result in a new average which is again compared to the threshold.

Once the average of the last N entries is greater than the threshold, the GPS receiver is activated, as shown in block 540. The GPS collects location readings, for example, in the "burst" mode. The location information received, as shown in block 550, and may be used for a variety of purposes, including being stored locally at the client device at block 560, transmitted to a server computer over a network at block 570, used to determine (and possibly also display) the geographic movement of the client device at block 580.

In addition to, or in lieu of an accelerometer, various other detection devices may be utilized to activate the location detection device. For example, barometers may be used to detect the vertical movement of the client device. In another example, a gyroscope may be used to determine the motion of the device. Once the readings from these devices reach an average threshold value for a particular period, the location detection device may be activated similar to the examples described above.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method of determining if a client device is moving, the method comprising:
   receiving N data points from an accelerometer of the client device;
   determining, by a processor of the client device, an average of the N data points;
   determining, if the average is greater than a threshold value, that the client device is moving; and
   activating, in response to determining that the client device is moving, a location determination device to generate geographic location information associated with the client device.

2. The method of claim 1, wherein the location determination device is a GPS receiver and the generated geographic location information includes GPS latitude and longitude coordinate pairs.

3. The method of claim 2, further comprising determining a path of travel associated with the client device based on the GPS coordinates.

4. The method of claim 3, further comprising storing the path of travel at the client device.

5. The method of claim 3, further comprising displaying the path of travel on a display of the client device.

6. The method of claim 2, further comprising:
   determining a location visited by the client device based on the GPS coordinates; and
   transmitting the location to a server computer.

7. The method of claim 6, further comprising receiving, from the server, a recommended location based on the transmitted location.

8. The method of claim 1, further comprising:
   receiving an additional data point from the accelerometer;
   removing an oldest data point from the N data points to obtain N−1 data points;
   determining a second average of the additional data point and the N−1 data points; and
   determining, by a processor of the client device, that the client device is moving if the second average is greater than the threshold value.

9. The method of claim 1, wherein the threshold value describes a limit associated with an average force identified by the accelerometer based on a user's motion.

10. A device to detect movement of a user, the device comprising:
    an accelerometer for detecting data points;
    memory for storing a last N detected data points;
    a location determination device; and
    a processor coupled to the accelerometer, the memory, and the location determination device, the processor configured to:
      receive the last N detected data points from the accelerometer of the device;
      store the last N detected data points in the memory;
      determine an average of the last N detected data points;
      determine, if the average is greater than a threshold value, that the device is moving; and
      activate, in response to determining that the device is moving, a location determination device to generate geographic location information associated with the device.

11. The device of claim 10, wherein the location determination device is a GPS receiver and the generated geographic location information includes GPS latitude and longitude coordinate pairs.

12. The device of claim 11, wherein the processor is further configured to determine a path of travel associated with the device based on the GPS coordinates.

13. The device of claim 12, wherein the processor is further configured to store the path of travel in the memory.

14. The device of claim 12, the device further comprising a display, and wherein the processor is further configured to display the path of travel on the display.

15. The device of claim 11, wherein the processor is further configured to:
    determine a location visited by the device based on the GPS coordinates; and
    transmit the location to a server computer.

16. The device of claim 15, wherein the processor is further configured to receive, from the server computer, a recommended location based on the transmitted location.

17. The device of claim 10, wherein the processor is further configured to:
    receive an additional data point from the accelerometer;
    remove an oldest data point from the last N detected data points to obtain N−1 data points;
    determine a second average of the additional data point and the N−1 data points; and
    determine that the device is moving if the second average is greater than the threshold value.

18. The device of claim 10, wherein the threshold value describes a limit associated with an average force identified by the accelerometer based on the device's motion.

* * * * *